United States Patent
Foster et al.

(10) Patent No.: US 6,466,550 B1
(45) Date of Patent: Oct. 15, 2002

(54) DISTRIBUTED CONFERENCING SYSTEM UTILIZING DATA NETWORKS

(75) Inventors: William R. Foster, San Jose; Cary W. FitzGerald, Pleasanton, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/190,034

(22) Filed: Nov. 11, 1998

(51) Int. Cl.[7] .......................... H04L 12/18; H04L 12/56
(52) U.S. Cl. ........................ 370/261; 370/268; 370/269
(58) Field of Search ............................... 370/260, 261, 370/266, 267, 268, 270; 379/201.01, 201.02, 202.01, 205.01

(56) References Cited

U.S. PATENT DOCUMENTS

| | | | |
|---|---|---|---|
| 5,127,001 A | * 6/1992 | Steagall et al. | 370/267 |
| 5,373,549 A | * 12/1994 | Bales et al. | 379/93 |
| 5,434,797 A | * 7/1995 | Barris | 364/514 |
| 5,530,699 A | * 6/1996 | Kline | 370/260 |
| 5,539,741 A | * 7/1996 | Barraclough et al. | 348/14.07 |
| 5,889,953 A | * 3/1999 | Thebaut et al. | 395/200.51 |
| 6,011,579 A | * 1/2000 | Newlin | 348/15 |
| 6,134,223 A | * 10/2000 | Burke et al. | 370/265 |
| 6,288,739 B1 | * 8/2001 | Hales et al. | 348/14.07 |
| 6,327,276 B1 | * 12/2001 | Robert et al. | 370/260 |

\* cited by examiner

*Primary Examiner*—Hassan Kizou
*Assistant Examiner*—Tim Spafford
(74) *Attorney, Agent, or Firm*—Marger Johnson & McCollom, PC (57) ABSTRACT

A distributed packet-based audio conferencing system, method for packet-based audio conferencing, and a transceiver for use in such conferencing are disclosed. The system uses a collection of transceivers, with each conference participant connected to a local transceiver. When a participant speaks, the local transceiver is responsible for relaying the speaker's voice over a packet network by multicast transmission to transceivers local to each other conference participant. If multiple participants speak simultaneously, a multicast talk stream may originate from each speaker's local transceiver. The total number of simultaneous speakers, however, is limited by an arbitration function resident in each transceiver.

The system reduces the costs associated with an always-up communication system. Compared to a data network solution employing a centralized bridge, the present conferencing system enjoys lower delay, lower bandwidth requirements, the ability to utilize voice compression throughout, and ease of reconfiguration.

47 Claims, 11 Drawing Sheets

DISTRIBUTED CONFERENCING SYSTEM UTILIZING DATA NETWORKS

FIELD OF THE INVENTION

This invention pertains generally to multi-point remote audio conferencing, and more particularly to such conferencing utilizing packet data networks.

BACKGROUND OF THE INVENTION

A hoot n' holler network is a multi-point four-wire audio conference network that is always 'up'. When someone wants to communicate over the network, they push a button and speak either through a microphone, handset, or squawk box. The button does not cause any signaling to occur. It simply enables the audio that is normally disabled to prevent noise from being injected into the network when the person is not speaking.

Hoot n' holler networks are used throughout the brokerage industry to communicate "The Morning Report" as well as to advise the trading community within a brokerage firm on market movements, trade executions, and so on. A typical brokerage firm will have several of these networks for equity, retail, bonds, etc., with size and the degree of interactivity varying depending on the application.

The hoot n' holler system is not specific to the brokerage industry. Many other industries require collaboration on a regular basis. Some of these collaborations can be done via a scheduled conference call, but in problem-solving situations, an ad-hoc conference over a permanent hoot n' holler network would be more efficient.

Hoot n' holler networks are typically spread over four to eight sites, although retail networks may have as many as 500 sites interconnected. Within a site, bridging is done locally with a standard audio or digital bridge circuit. Between sites, the bridging is often provided by a phone carrier. The carrier provides dedicated (either analog or digital) four-wire connections into a central bridge. The customer is charged on a monthly basis for the service, with most of that cost attributed to leased-line point-to-point connections between the various sites and the bridge.

Figure 1:
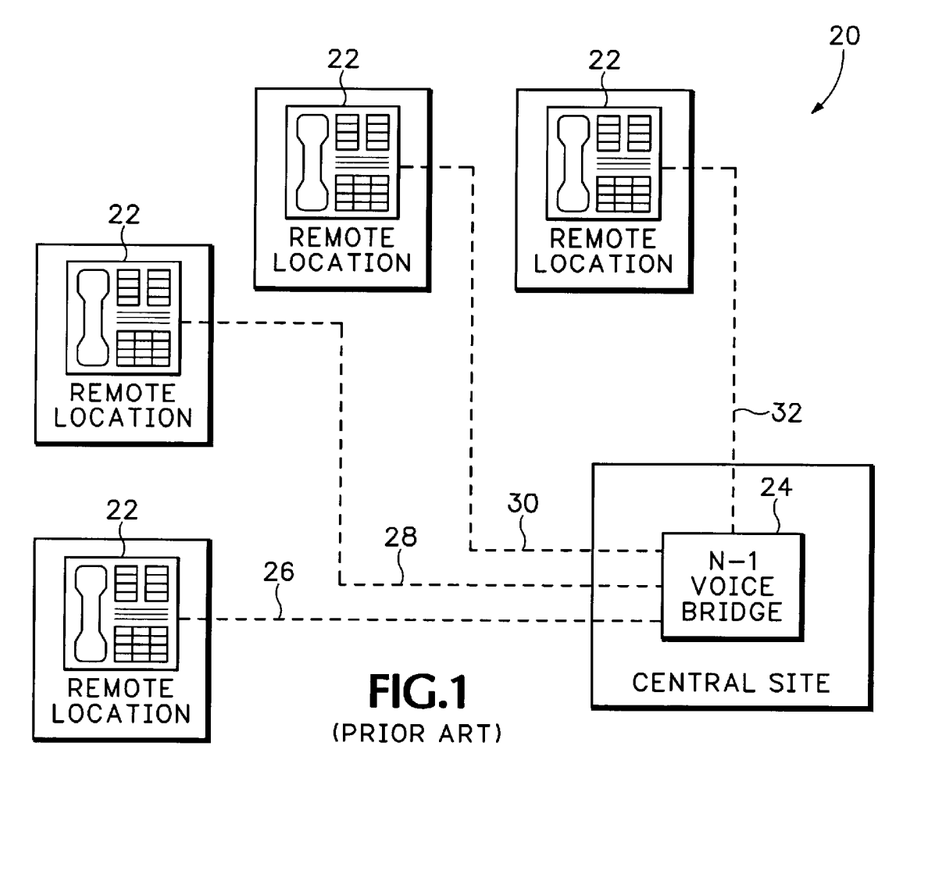
FIG. 1 illustrates a prior art hoot n' holler network.

FIG. 1 shows an example hoot n' holler network 20. Conference sets 22 at each remote location are connected to a central bridge 24 via leased lines 26, 28, 30, and 32. Four wire connections and N–1 bridges are used to avoid echo problems (an N–1 bridge mixes up to N possible input signals, but subtracts out each speaker's contribution individually for the mixed signal being transmitting back to him).

SUMMARY OF THE INVENTION

Hoot n' holler networks are costly, particularly because they require dedicated leased lines for their operation. The present invention provides a packet data solution to an audio conferencing system that replaces the leased lines with data network connections. The typical hoot n' holler network has less than 15% overall utilization—as the present invention utilizes data network bandwidth primarily when someone is actually speaking, the present invention can provides significant cost savings, compared to dedicated connections, for the typical hoot n' holler user.

The present invention does more than merely replace the leased lines of FIG. 1 with packet data connections. The present invention removes the requirement for a central bridging site altogether. Instead, direct connections between conferencing system endpoints are provided "in-the-cloud" of the data network, e.g., using multicast packet transmission. When a conference participant speaks, a packetized version of their voice is multicast to all other participants. Transceivers local to each conferencing system endpoint provide speaker arbitration and/or mixing necessary for the system to operate. This system provides several advantages: it allows data network bandwidth reduction by avoiding multiple unicast signals, allows voice compression to be used throughout the conference to further reduce bandwidth, is easily rescaled and reconfigured, and eliminates a portion of the delay inherent in a system requiring communications to-and-from a central site.

In one aspect of the present invention, a distributed packet data network conferencing system is disclosed. This system comprises multiple packet data conferencing transceivers interconnected via a packet data network. Each transceiver is also connected to at least one conferencing endpoint local to that transceiver. The transceiver comprises two data flow paths—a first path from the local conferencing endpoint to the network, and a second path from the network to the local conferencing endpoint. Each transceiver implements a switchable connection in the first path controlled by an arbitrator within the transceiver.

The conferencing transceivers utilized in the system above comprise a further aspect of the present invention. In particular, the arbitrator contained in each transceiver enables distributed conferencing by providing control over the number of simultaneous talk streams present in the system. Preferably, the arbitrator monitors source attributes of conference data appearing on both data paths. The arbitrator opens the switch to prevent transmission of the local signal when the number of sources of conference data exceeds a preset maximum and the local signal loses an arbitration against the remote sources. The arbitrator may preferably also provide guidance to an input selector inserted in the second data path, allowing it to discard packets from remote sources that have lost arbitration.

In yet another aspect of the present invention, a method for packet data conferencing between multiple remote conference participants is disclosed. The method comprises transmitting each remote conference participant's voice to other remote conference participants by transmitting a transmit packet data talk stream from a transceiver local to that conference participant to a multicast group address. The method further comprises receiving, at each transceiver local to a remote conference participant, receive packet data talk streams from other remote conference participants sent to the multicast group address. At each transceiver, that transceiver's transmit packet data talk stream source is ranked against each receive packet data talk stream source. When the total number of packet data talk streams sensed by that transceiver exceeds a preset maximum and the transmit packet data talk stream source ranks lowest, that transceiver inhibits transmission of that transceiver's transmit packet data talk stream.

BRIEF DESCRIPTION OF THE DRAWING

The invention may be best understood by reading the disclosure with reference to the drawing, wherein.

DETAILED DESCRIPTION OF THE PREFERRED EMBODIMENTS

The present invention generally applies to data network audio conferencing systems (although audio-plus conferencing systems, such as audio-plus-video, may also utilize the invention). Systems according to the invention require at least one transceiver for each remote site in the conferencing system. The transceiver may take several physical forms: it may be contained in a network-connected conference set sitting on a participant's desk; it may be contained in a personal computer; it may be a stand-alone unit connected between a phone terminal and a network bridge or router or connected only to a network bridge or router; or it may be partially or totally subsumed in a network voice gateway or router.

The following terms have the following meanings for purposes of this disclosure. A transceiver relays data bi-directionally between two interfaces. Of course, if both interfaces are packet data interfaces, they may be implemented using the same physical interface. A transceiver interface is "remote" when communication over the interface utilizes group addressing. Conversely, a transceiver interface is "local" when the connection utilizes addressing (or hard-wiring) to a specific conference point or points. A conferencing point may, e.g., comprise a single conferencing set (e.g., a speakerphone) or a local bridge connected to multiple conferencing sets. From the standpoint of a transceiver, both local conferencing points and other transceivers are "sources" of conference data.

A Packet Network Centralized Solution

Figure 2:
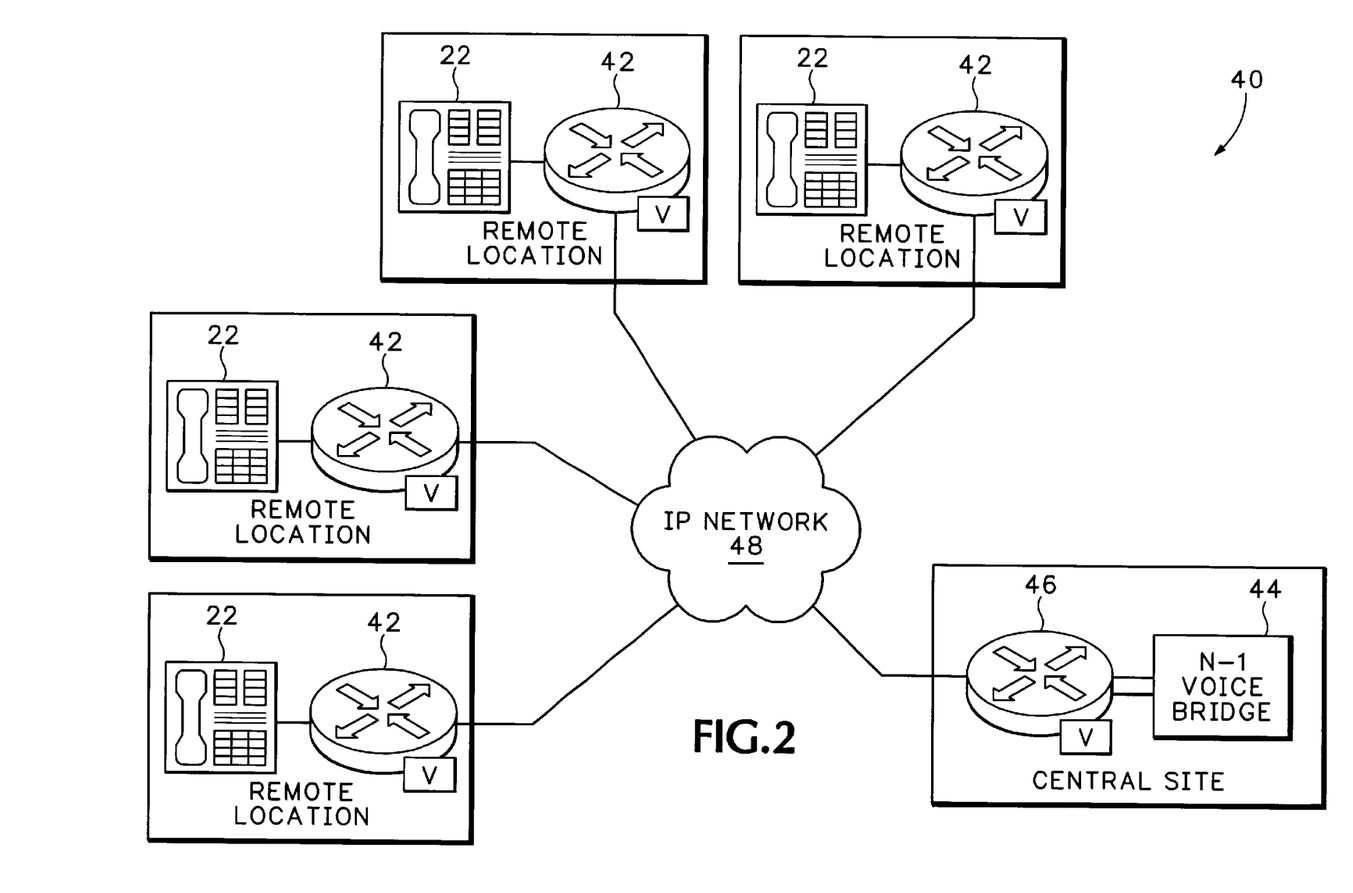
FIG. 2 illustrates a packet data conferencing system employing a centralized bridge.

A data network adaptation of a conferencing system as shown in FIG. 1 is not trivial. In what might appear at first blush to be a straightforward approach, leased lines 26, 28, 30, and 32 to and from central site N−1 voice bridge 24 could be replaced as shown in FIG. 2: conference sets 22 would instead connect to voice gateways 42, and an N−1 voice bridge 44 would connect to a separate voice gateway 46. Gateways 42 and gateway 46 connect to IP (Internet Protocol) network 48. Such a system 40 could use voice activity detection (VAD) to reduce traffic into the central site, e.g., by only transmitting packets for those speaking. But creating separate traffic out of the voice bridge for each remote location could swamp network 48 during conferencing. Furthermore, gateway 46 and voice bridge 44 hardware preferably would be required to scale as the number of users of a conferencing network increased.

Besides bandwidth and scaling, this centralized data network conferencing solution has several additional difficulties related to the IP implementation. One difficulty is the added delay caused by buffering both at central gateway 46 and at the endpoint gateways 42. At both locations, arriving packets must be buffered for a sufficient time to encompass packet jitter, i.e., variances in sequential packet arrival rate, and ensure smooth playout. These dual buffer delays, as well as the additional algorithmic delay associated with dual compression and decompression, add to create an overall delay that may make interactive conferencing difficult.

A second additional difficulty precludes the use of voice compression, a common network bandwidth reduction tool, within the conference. Gateways 42 may compress, or encode, voice traffic before sending it to gateway 46. Gateway 46 must decode this traffic before passing it to bridge 44 for mixing. After bridge 44 mixes the conference traffic, it passes it back to gateway 46. If gateway 46 encodes the mixed traffic to reduce bandwidth, this produces a "tandem encoding" of the signals that were just decoded and mixed. Many low-bit-rate encoders produce particularly poor audio quality for tandem encoded data—poor enough that conferencing system 40 of FIG. 2 may be precluded from using compression algorithms to reduce bandwidth.

Some, but not all, of the problems of this centralized approach may be mitigated by adding complexity to gateways 42, gateway 46, and voice bridge 44. For example, asymmetric transport may be used to reduce IP traffic and the load on gateway 46 and bridge 44. With asymmetric transport, sending gateways 42 unicast their outgoing conference traffic to central gateway 46. However, central gateway 46 may multicast a mixed conference signal to all endpoint gateways 42. For best performance, this system would require creation and transmission of, in addition to a multicast mixed signal, several N−1 signals—one for each sending gateway 42. Receiving gateways 42 would also be responsible for selecting the unicast, rather than the multicast, return signal when they were transmitting.

The problem of tandem encodings may be solved, at some bandwidth expense, by asymmetric coding. In a preferred asymmetric coding approach, sending gateways 42 send packets of uncompressed PCM samples to central gateway 46 and on to bridge 44. Gateway 46 compresses the returned mixed signal from bridge 44 before multicasting it back to endpoint gateways 42. Since a typical scenario comprises many more listeners than talkers, compression of the mixed signal decreases bandwidth greatly, while the additional bandwidth borne by the sending channels results in greatly increased conference voice quality.

Finally, the problem of resource scaling may be at least partially addressed at central gateway 46 or at gateways 42 by limiting the number of possible simultaneous talk streams. Gateway 46 may arbitrarily, or according to some rule, select talk streams up to a maximum fixed number of incoming talk streams to pass to bridge 44. Alternatively, or additionally, bridge 44 could affix the number of current contributing sources to outgoing mixed signal packets. Gateways 42 could then suppress outgoing talk streams if the mixed signal count was at or near its limit. Note that the Real-time Transport Protocol (described below) provides a mechanism for identifying both the number of sources and the identity of each source contributing to a stream.

Distributed Conference Operation

A centralized packet conferencing system as described above contains several undesirable features. Talkers must be connected to the packet network through a connection capable of supporting an uncompressed voice data rate. Listeners must endure two separate jitter-induced delays. Someone is responsible for setting up and maintaining a smart bridge, and configuring smart gateways as well. The present invention overcomes these difficulties by removing central gateway 46 and bridge 44 and replacing them with a distributed conferencing system.

The present invention places all conferencing functions near the endpoints of the conferencing system, thus isolating them to the greatest extent possible from disadvantageous peculiarities of the IP network. The endpoint transceivers each decide who will talk and who will be heard. Preferably, talk streams cross the IP network only once—this both avoids tandem packet delay buffers and allows originating talk streams to be compressed. Conference participants all receive the same multicast signals, such that participants can be freely added and deleted from a conference without reconfiguring each transceiver.

Figure 3:
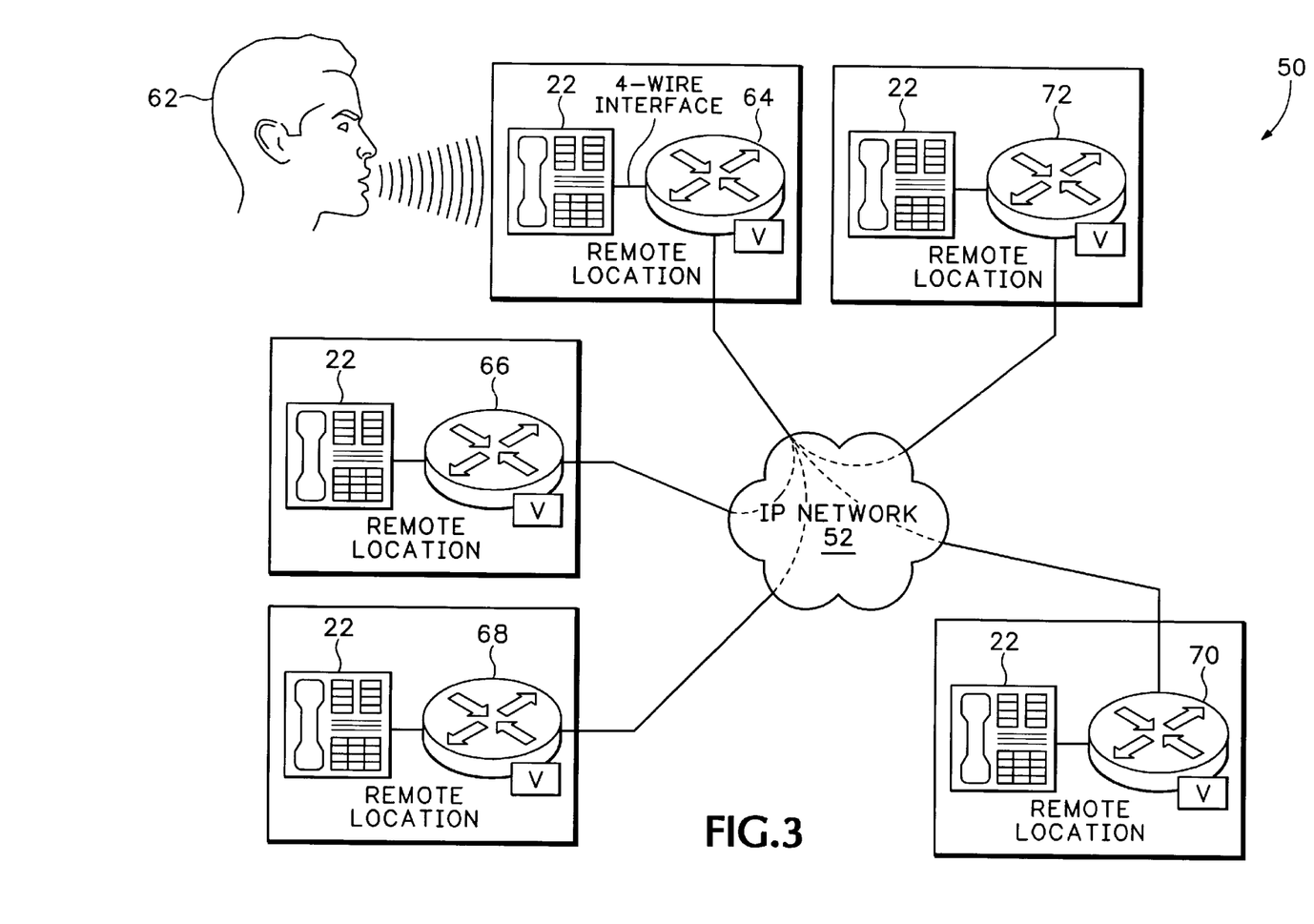
FIGS. 3 and 4 show a distributed packet data conferencing system according to one embodiment of the present invention, with one and with two speakers respectively.

In almost all conferencing situations, only one or a few participants speak at once. By using VAD, data packets need only be transmitted for those participants currently speaking. For instance, in conference system 50 of FIG. 3 a single speaker 62 is active. Gateway 64 multicasts speaker 62's voice to gateways 66, 68, 70, and 72 at other conference locations. No N–1 bridging is required; gateway 64 simply and locally performs the "N–1" function, as it does not receive its own transmissions. Gateways 66, 68, 70, and 72 pick up the multicast signal, relay it to their respective endpoints 22, and the conference communication path is complete.

Figure 4:
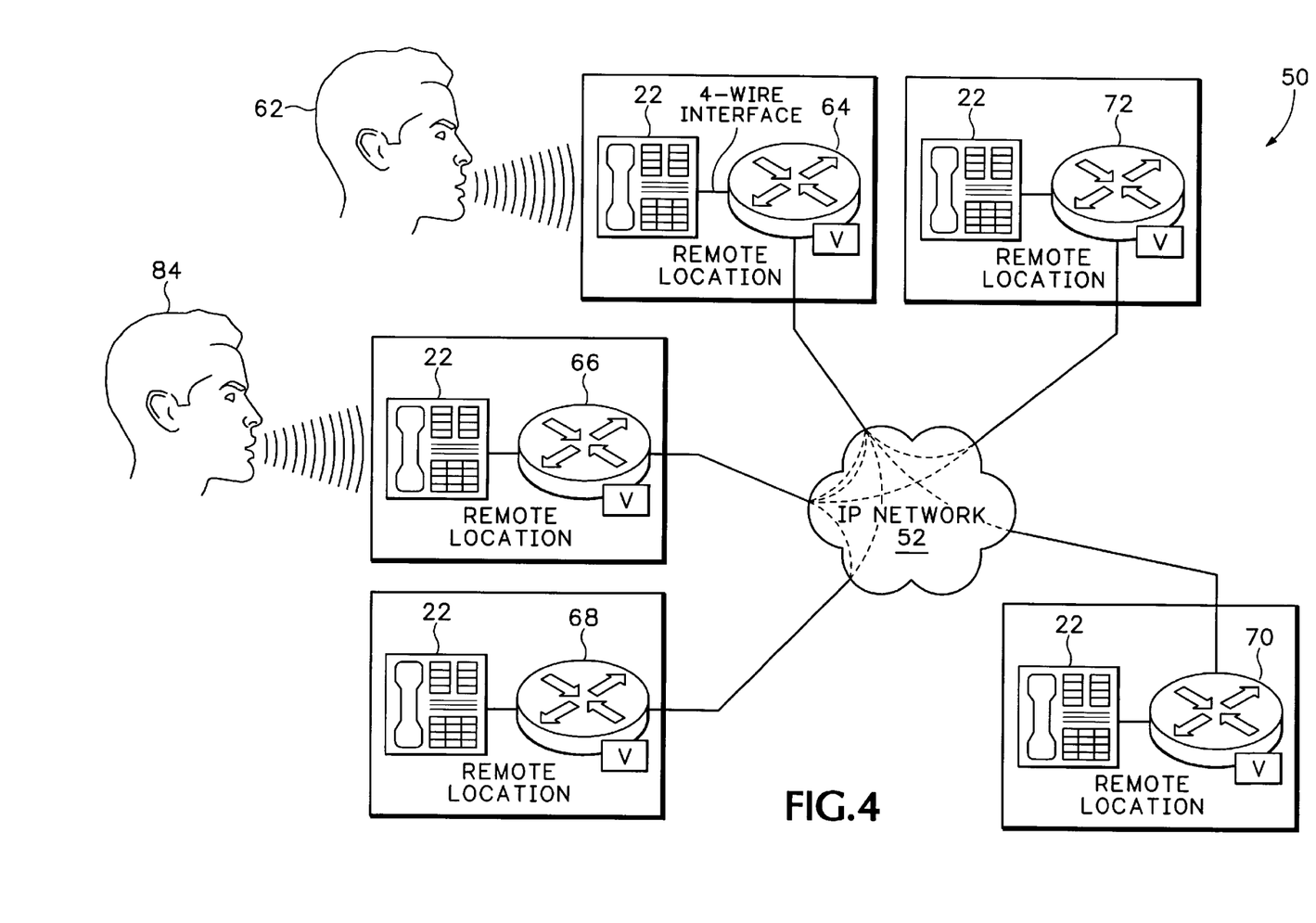

FIG. 4 shows two speakers 62 and 84 utilizing conference system 50. If both speakers are allowed to talk at once, gateways 64 and 66 will each multicast a talk stream from their respective speaker to each other gateway in system 50. Each gateway receiving two talk streams (i.e., gateways 68, 70, and 72) will either mix the two speakers' voices or arbitrate and select one speaker's voice to pass to conference sets 22. Mixing and arbitration are discussed in the following section.

Figure 5:
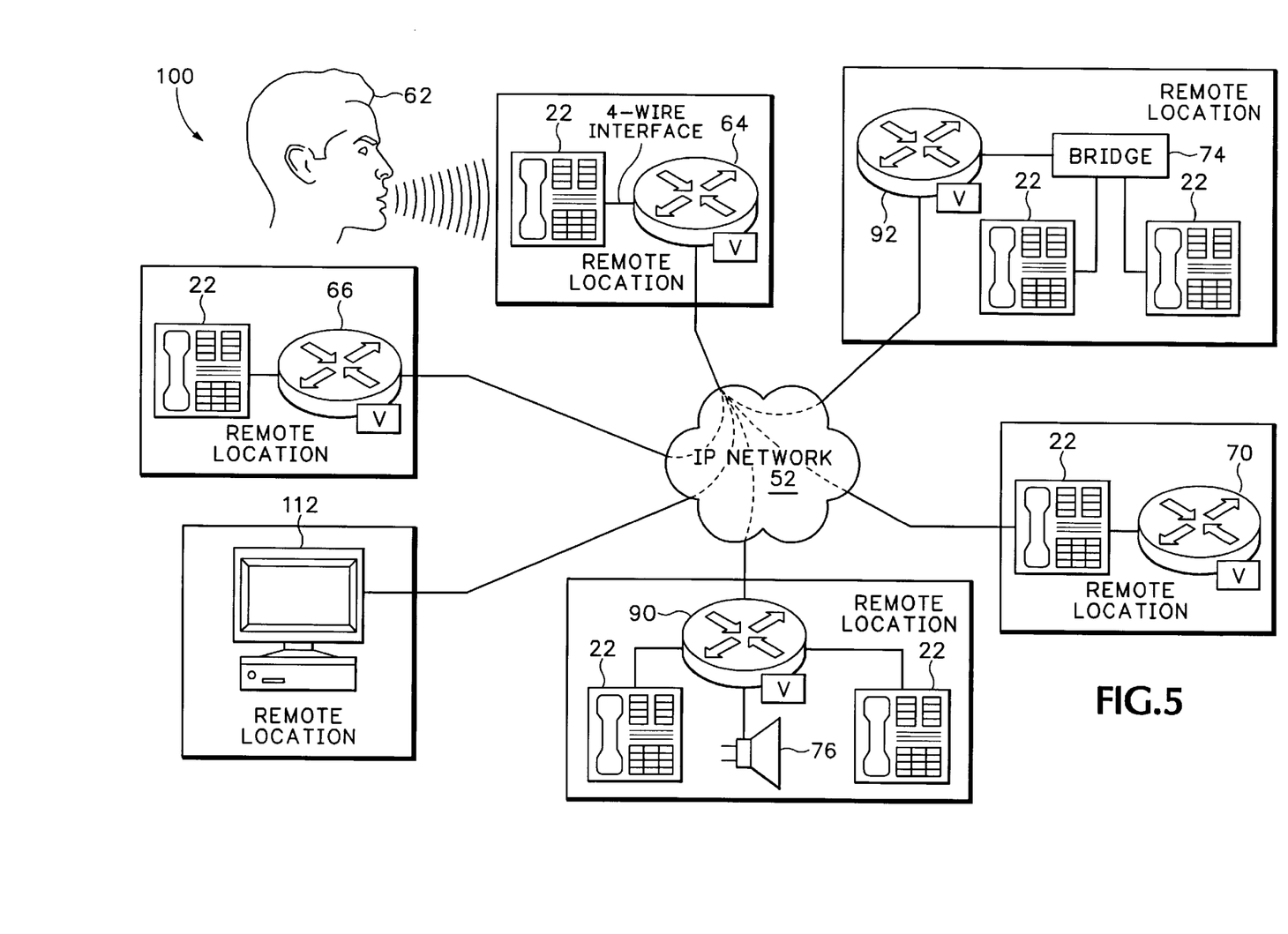
FIG. 5 shows a distributed packet data conferencing system, illustrating several connection options for a system according to an embodiment of the invention.

FIG. 5 shows some of the endpoint options for a conferencing system according to the present invention. In FIG. 5, two conference sets 22 and a receive-only conference set 76 are illustrated separately connected to gateway 90 at one remote location. Also, a local bridge 74 (either analog or digital) is shown connected to gateway 92 at another remote location. Bridge 74 mixes its two local streams with each other and with the remote talk streams passed through gateway 92. Generally, non-network local conferencing systems of different sizes may be connected as conferencing endpoints to a data network remote conferencing system according to the invention. Note that a local bridge appears as a single speaker to its network transceiver.

FIG. 5 illustrates one further endpoint configuration. Transceiver 112 performs conference set functions and conference data packet functions. This transceiver connects directly to IP network 52 and needs no voice gateway. It handles receive and transmit data packets and includes an audio interface for a speaker. Transceiver 112 may, e.g., be implemented on a typical desktop computer running VoIP software incorporating one or more of the conference-specific functions described below.

Mixing and Arbitration

A centralized bridge performs two desirable functions: it combines incoming talk streams to create a single outgoing talk stream for each endpoint, and it ensures that all participants hear the same conference. The distributed system of the present invention preferably either emulates these bridge functions or provides an acceptable alternative. Unless a distributed system provides some sort of distributed arbitration function, however, there is at least the possibility for a large number of talk streams to be occasionally directed to a given endpoint.

As long as the current number of speakers in a distributed system does not exceed a preset maximum, transceivers may allow mixing of all speakers. In this mode, transceivers "play out" packets received from each active speaker into a mixer, and the mixer output is conveyed to the local conference set.

When the number of speakers in a conference exceeds the intended playout capabilities of the system, the distributed transceivers must provide some type of arbitration. One type, receiver arbitration, has receivers decide whether to keep or throw away packets from each received source based on some decision criteria. Sender arbitration, on the other hand, has senders arbitrate and decide whether to send and/or whether to continue sending their particular talk stream. Mixed arbitration uses a combination of sender and receiver arbitration.

Real-time Transport Protocol

Arbitration with the present invention may advantageously be based on information gleaned from existing data transport protocols. One transport layer data protocol useful with the present invention is the Real-time Transport Protocol (RTP). RTP is a potential standard described in RFC 1889, a Request for Comments generated by the Network Working Group. RTP provides network transport functions suitable for real-time audio and video, including multicast functionality. RTP does not guarantee a quality of service or prevent out-of-order packet delivery. RTP also includes RTCP (Real-time Transport Control Protocol), which is generally used for monitoring a session and conveying information about its participants.

Each RTP packet has a header that is at least three 32-bit words in length, following this format:

```
 0                   1                   2                   3
 0 1 2 3 4 5 6 7 8 9 0 1 2 3 4 5 6 7 8 9 0 1 2 3 4 5 6 7 8 9 0 1
```

| V=2 | P | X | CC | M | PT | sequence number |
|---|---|---|---|---|---|---|
| timestamp ||||||||
| synchronization source (SSRC) identifier ||||||||
| contributing source (CSRC) identifiers ... ||||||||

The first header word contains a version field (V), a padding bit (P), a header extension bit (X), a CSRC count field (CC), a marker bit (M), a payload type field (PT), and a sequence number field. The second word contains a packet timestamp, and the third word contains a synchronization source (SSRC) identifier. If data from several RTP sources is present in the packet (e.g., because the sources were mixed), the CC field specifies the number of contributing sources, and an additional word is attached to the header for each contributing source—each of these words contains a contributing source (CSRC) identifier, which is essentially the SSRC of the contributing source.

Several of these RTP header fields are potential candidates for use with source arbitration. For instance, both the sequence number and the timestamp are randomly initialized for each source. The sequence number increments by one for each RTP data packet sent, while the timestamp reflects the sampling instant of the first octet in that RTP data packet, and generally increments at the sampling frequency of the data. The SSRC identifier may also be useful; it is randomly generated, is guaranteed to be unique for each source, and is generally fixed for the duration of an RTP session. Finally, the header extension bit may be enabled and arbitration information may be placed in a valid RTP header extension.

SSRC Arbitration

The preferred method of performing RTP source arbitration in an embodiment of the present invention is to apply arbitration rules to the source-unique received-packet SSRC identifiers. SSRC arbitration generally would break ties caused when several sources desire to simultaneously transmit and all cannot be received by the endpoints. For instance, the source(s) with either the lowest or highest SSRC(s) may always be declared the winner(s).

A simple case of an SSRC arbitration embodiment of the present invention is one using a single multicast group with no mixing. In this case, if two or more persons attempt to speak simultaneously an SSRC-based arbitration function will choose the one speaker who will be heard by all transceivers. If the arbitration is done by the sending transceivers, each may compare its own SSRC to that of its competitors and sever broadcasting if it loses arbitration. If the arbitration is done by the receiving transceivers, they compare SSRCs from all received talk streams and select a winner. Preferably, and as shown in the following example, each transceiver employs a combination of sender and receiver arbitration.

Each endpoint transceiver may employ the following arbitration rules:

1. A local sending endpoint will be arbitrated out if its transceiver has already begun receiving a remote talk stream.
2. Sending transceivers perform SSRC arbitration if they receive an incoming RTP talk stream during an initial "arbitration time" after they begin transmitting; this time period in some embodiments equals an estimated worst case round-trip delay, and in others may be indefinite in length (i.e. continuous arbitration).
3. Sending transceivers who lose arbitration because they have a lower SSRC will stop sending, at least until the end of the winner's current talk spurt.
4. Receiving transceivers that receive multiple RTP talk streams will pick the one with the highest SSRC and ignore the rest.

Figure 6:
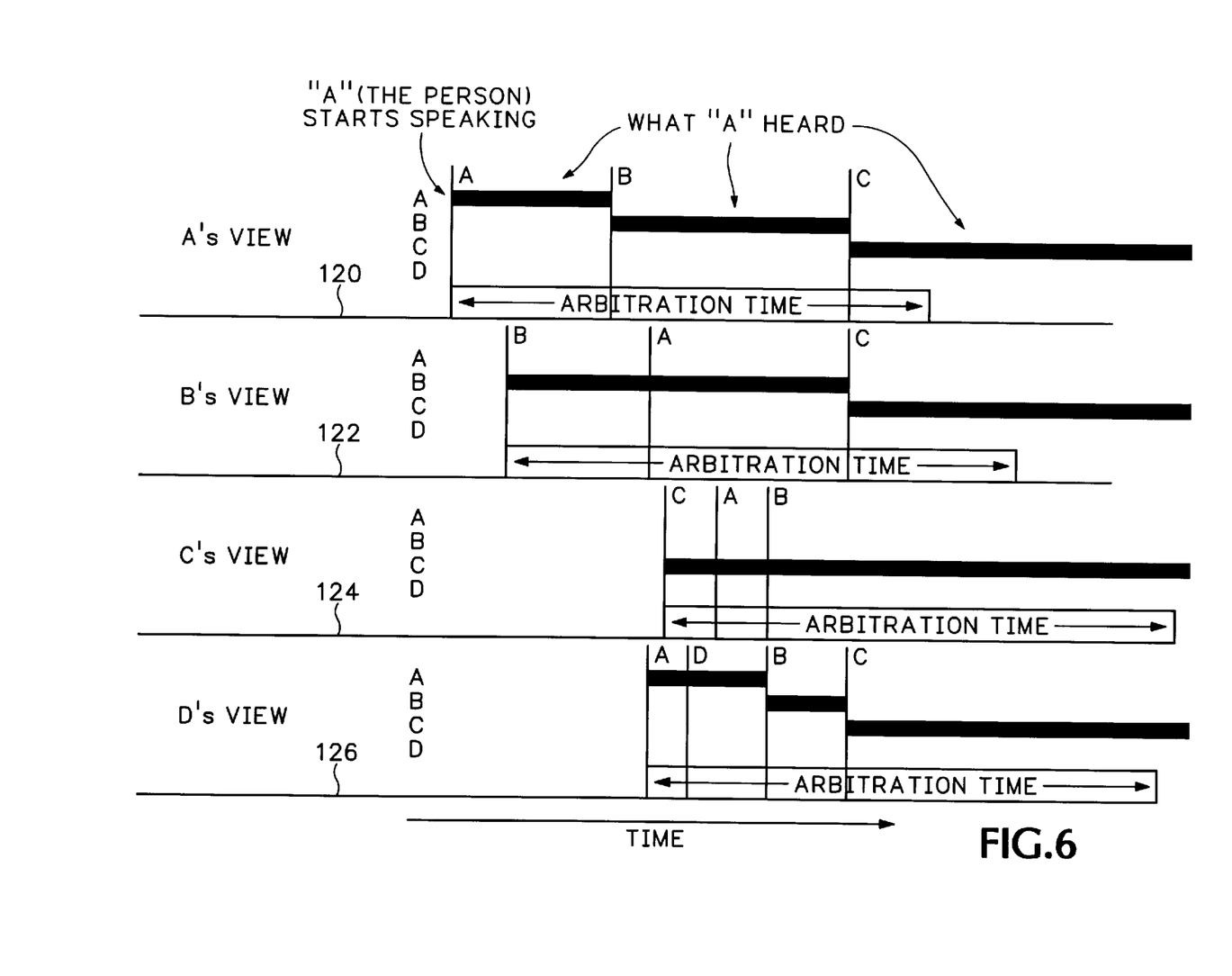
FIGS. 6 and 7 contain speaker arbitration timing diagrams.

FIG. 6 shows respective timelines 120, 122, 124, and 128 for each of four transceivers A, B, C, and D in a distributed conferencing system. FIG. 6 illustrates the timing realities of a distributed conference with finite transport delays—although each speaker begins speaking at approximately the same "real" time, each transceiver has a distinctly different view of when each speaker began speaking. The arbitration takes place over a finite time; at the end of this time, 1) all receivers should have chosen the same talk stream as the winner, despite their different views of the world, and 2) senders should know whether they have won or lost arbitration. If losing senders turn off their transmission, traffic will quickly reduce to a single multicast talk stream.

In the example of FIG. 6, the vertical bars show when each speaker begins speaking, from each listener's viewpoint. The horizontal bars show which talk stream is chosen by a listener's transceiver as the arbitration winner. SSRC priority ranks from "A" to "D"—sender "A" should lose all arbitrations, and sender "D" should win all arbitrations. As viewed in a common timeframe, A speaks first, followed in order by B, C, and D. From the viewpoint of transceivers A, B, and C, each speaks first, and so each begins transmitting. Although D has the highest SSRC, it actually receives packets from A before it begins transmitting, and so D's voice is never transmitted.

A switches talk streams two times. It begins with its own talk stream. Well into its arbitration period, A receives B's talk stream and turns off its own. Finally, near the end of the arbitration period, A receives C's talk stream and begins ignoring B's.

B only switches talk streams once. It also begins with its own talk stream. When it receives A's talk stream, it wins this arbitration, and thus ignores A. When it receives C's talk stream, B loses and turns off its own talk stream.

C never switches talk streams. It begins with its own talk stream, and never receives a talk stream from a source with a higher SSRC. C thus becomes the active speaker for the conference.

D, like A, first likes A, then B, then C. Note that if D did no receiver arbitration, it would still eventually end up receiving only C once A and B stopped sending.

Figure 7:
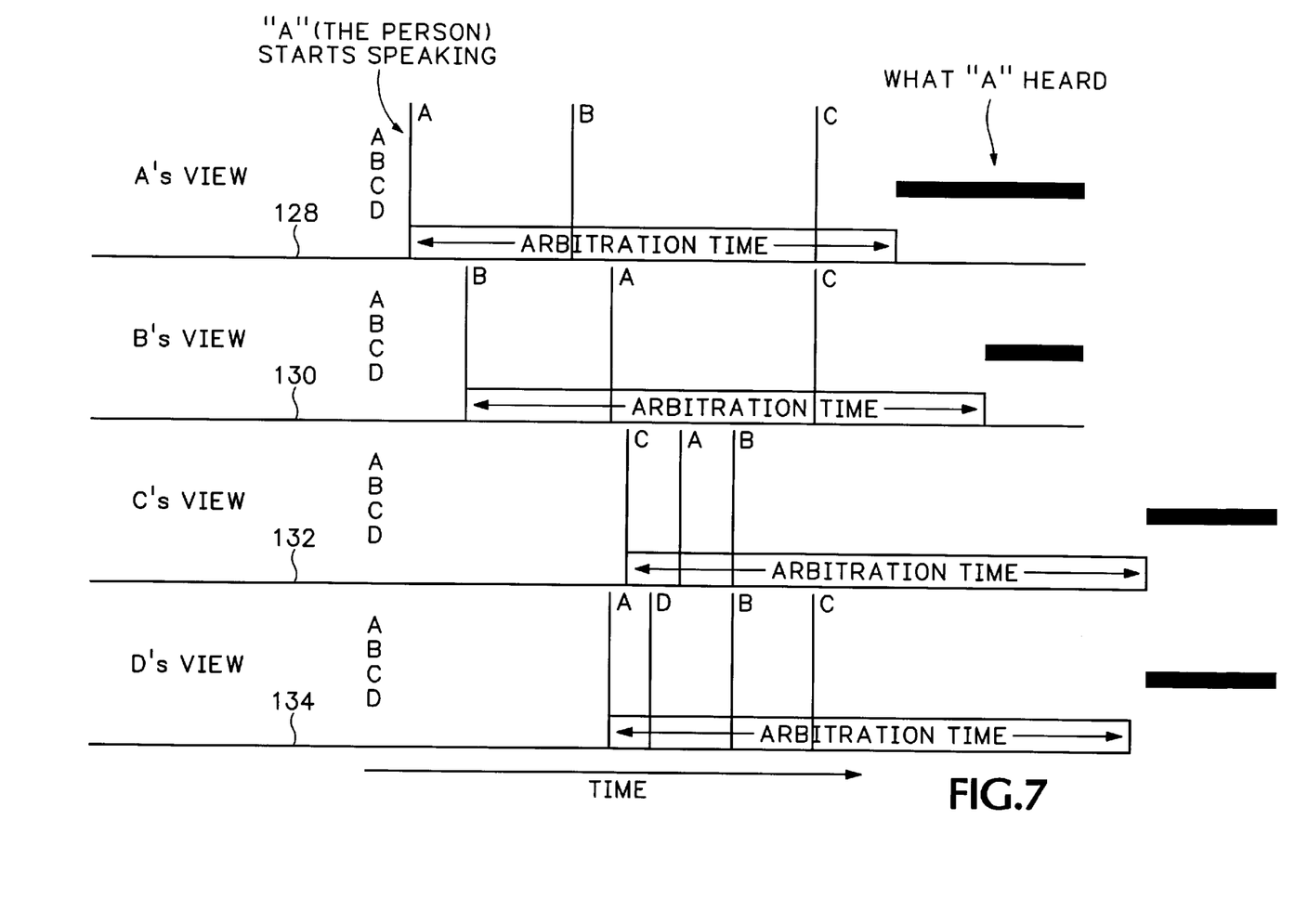

Although such speaker collisions may be infrequent in practice, audible effects of these collisions may preferably be avoided by delaying playout of any signal until the end of the arbitration period. This delay avoids what may be disconcerting or annoying garble due to source switching on some transceivers during arbitration. FIG. 7 shows this concept for the same scenario as FIG. 6. Although arbitration proceeds identically to that of FIG. 6, source playout is delayed such that each transceiver plays only C. One method of accomplishing this is to set the jitter buffer delay initially to be at least equal to the arbitration time, and then allow the buffer to be flushed if an arbitration is lost during this delay. In many circumstances, the arbitration time will pose a reasonable delay for the jitter buffer as both are related to worst-case transport time.

These arbitration methods scale naturally to conferencing systems allowing two, or more generally, "n" simultaneous speakers to be mixed. For example, in a two-speaker system no arbitration need be performed unless packets from a third speaker arrive within one arbitration time from the arrival of packets from a second speaker.

Other Forms of Arbitration

Speaker prioritization with the above system is random. RTP specifies that each source will create a random SSRC for its session—the highest random SSRC will always trump with the "highest SSRC rule." If the conference is left "up" for an extended period, by the RTP definition this initial SSRC assignment would create a fixed prioritization. Prioritization may be varied by having transceivers periodically change SSRCs when they are not transmitting (although this may confuse systems doing monitoring). Or, a desired speaker prioritization could be hardcoded by forcing a nonrandom SSRC generation. But if an arbitration period is used, prioritization should preferably only come into play in unusual circumstances where speakers start speaking within a few hundred milliseconds of each other.

One other characteristic of an RTP multicast group is that each group member periodically transmits Real-time Transport Control Protocol (RTCP) packets. RTCP carries a persistent transport-level identifier for an RTP source called the canonical name or CNAME. Since the SSRC identifier may change if a conflict is discovered or a program is restarted, receivers require the CNAME to keep track of each participant.

Transceivers may utilize the CNAME RTCP field to implement arbitration. For instance, each transceiver may keep a ranked list of network subscribers by name. This name is transmitted in the CNAME field of RTCP packets sent from each local transceiver, and can be coordinated by each transceiver with the appropriate SSRC for that subscriber's RTP transmissions. After coordination, that SSRC is given a ranking according to the CNAME ranking. Each person's arbitration ranking is guaranteed, no matter what random SSRC they are assigned.

Other types of arbitration may work most of the time, although not as simply as SSRC arbitration. RTP sequence numbers and timestamps may not provide reliable arbitration: they are not guaranteed to be unique for every source (although duplication among sources is highly unlikely), and they change with every data packet. This latter issue becomes a problem when not all transceivers receive the first packet from a source (remember that RTP does not guarantee packet delivery). A transceiver receiving a second packet (thinking it to be the first) could conceivably produce a different arbitration result that other transceivers.

RTP header extension arbitration is another possibility. Instead of comparing SSRC values, arbitration could compare information stored in an RTP header extension. This information could be carried only for endpoints having override or "super priority". It could also resemble a fixed SSRC scheme and be carried for all participants.

Finally, arrival-time arbitration is a valid option for networks that allow a larger number of simultaneous speakers, generally three, four, or more. For a single-speaker system, a simple first-in-time-wins receiver arbitration scheme generally cannot work without source synchronization. First-in-time cannot guarantee consistent conference-wide arbitration results, as source arrival sequence may differ depending on each endpoint's view of the network.

Transceiver Hardware Configurations

Figure 8:
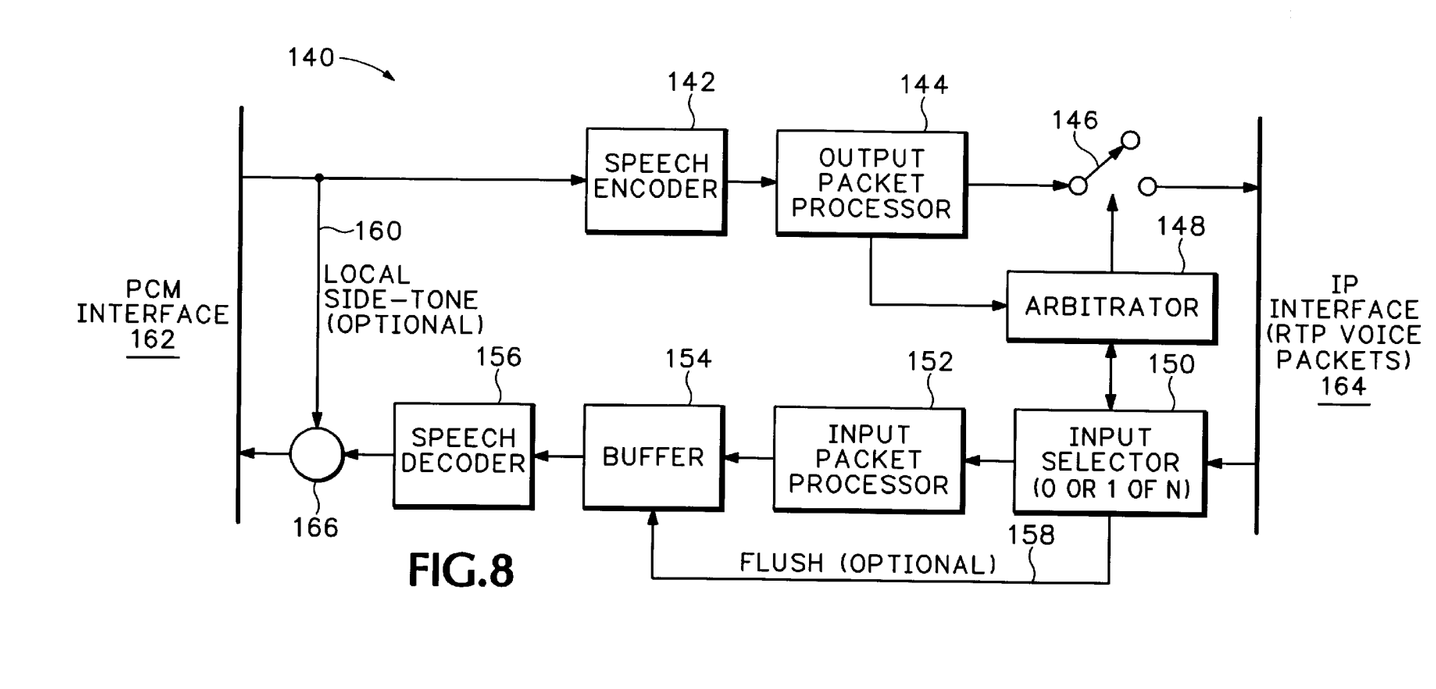
FIGS. 8–12 contain block diagrams of conferencing transceiver embodiments according to the present invention.

A block diagram for a single-speaker conferencing transceiver 140 is shown in FIG. 8. A PCM interface 162 links the transceiver to a conference set (or local bridge). An IP interface 164 links the transceiver to an IP network. By definition, transceiver 140 operates as a "sender" when it is transferring data from PCM interface 162 to IP interface 164, and operates as a "receiver" when it is transferring data in the opposite direction.

Transceiver 140 contains several well-understood blocks. Speech encoder 142 and decoder 156 preferably implement widely available compression algorithms, such as those described in ITU Recommendations G.726 (Adaptive Differential Pulse Code Modulation), G.728 (Low-Delay Code Excited Linear Prediction), G.729 and G.729 Annex A (Conjugate Structure Algebraic-Code-Excited Linear Prediction), and G.723.1 (Multi-Pulse Maximum Likelihood Quantizer). A simple encoder 142 may implement standard PCM (ITU Recommendation G.711), which results in no compression. A voice activity detector may also operate as part of encoder 142. The operation of output packet processor 144 also is generally well understood—processor 144 takes one or more encoded frames of data from encoder 142, places these in the payload of an RTP packet, and fills in RTP packet header values appropriately. Similarly, input packet processor 152 interprets RTP headers, extracts voice frames from received packets, and places these frames in the proper sequence in buffer 154.

Buffer 154 operates according to well-understood VoIP jitter buffer principles. Buffer 154's primary function is to prevent data starvation during playout of received packets. Buffer 154 delays playout of early-arriving packets, such that packets arriving relatively "late" do not miss their appointed playout time. The operation of buffer 154 may also be tied to arbitration, e.g., by a flush buffer signal path 158. If data frames are buffered for a source that later loses arbitration, input selector 150 may flush those frames from buffer 154 before they are played out. And the minimum buffer size may also be controlled by input selector 150 in order to prevent switching garble, as discussed above in conjunction with FIG. 7.

Arbitrator 148 implements conference arbitration rules. Arbitrator 148 receives outgoing packet header information from output packet processor 144. Arbitrator 148 also receives incoming packet header information for all input talk streams from input selector 150. Utilizing the conference-wide arbitration rules, arbitrator 148 decides whether output packet processor 144's results should be relayed to IP interface 164 and activates switch 146 appropriately.

If transceiver 140 wins arbitration, arbitrator 148 may optionally signal input selector 150 to select no input. This allows input selector 150 to flush buffer 154 and avoid garble. Note that output packets need not be looped back to the sending transceiver, as a local side-tone path 160 may be provided within transceiver 140. Side-tone may be added to speech decoder 156's output at adder 166—side-tone and speech decoder output may also be switched in a single-speaker system.

Besides operating as a sender arbitrator, arbitrator 148 may also provide receive arbitration for input selector 150. In this mode, arbitrator 148 applies the conference-wide arbitration rules to choose one of n incoming packet data streams for further processing. Arbitrator 148 notifies selector 150 of the appropriate incoming stream. Selector 150 responds by forwarding only that stream to input packet processor 152, and preferably by flushing buffer 154 if needed.

Figure 9:
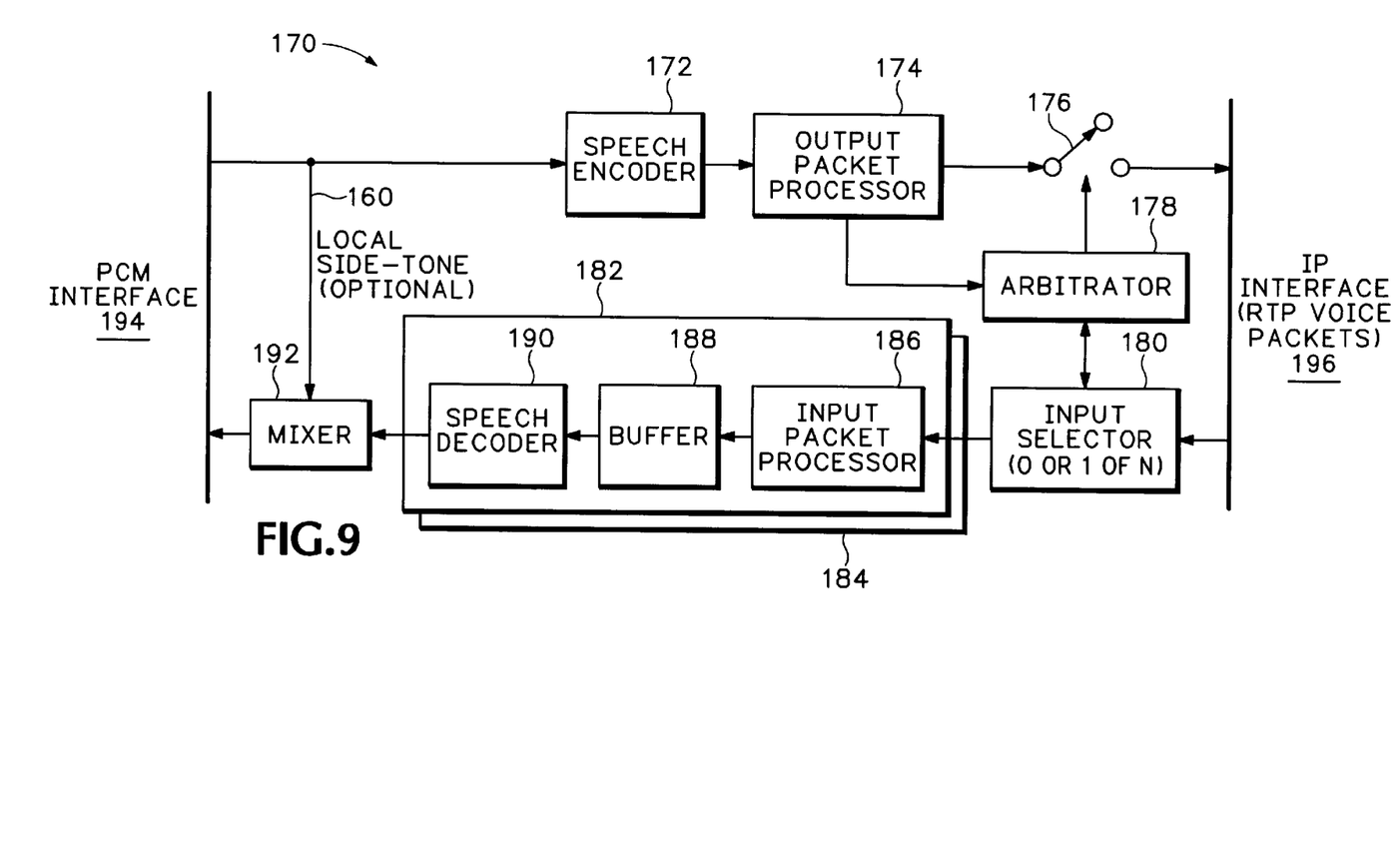

A block diagram for a multi-speaker conferencing transceiver 170 is shown in FIG. 9. Overall operation of transceiver 170 is similar to that of transceiver 140. But because transceiver 170 must handle multiple simultaneous speakers, it provides multiple speech-packet processing paths 182 and 184 (other such parallel paths may be added as needed). A buffer flush signal path is not shown; although it may be added to transceiver 170, arbitration generally becomes less infrequent as the number of speakers is allowed to increase. In fact, receive arbitration may not be implemented at all in a multi-speaker system.

If transceiver 170 expands to include three, four, or more possible simultaneous speakers, receive arbitration may alternately be based strictly on arrival time (i.e., in a four-simultaneous-speaker network, the first four speakers talk streams to arrive at transceiver 170 would be selected, and any further simultaneous streams would be thrown away). Although such a system does not absolutely guarantee that everyone always hears the same thing, a contrary result is unlikely, and large numbers of simultaneous speakers will generally be naturally limited to short durations.

A multi-speaker transceiver 170 may also include a mixer 192. Mixer 192 mixes decoded speech samples from each speech-packet processing path 182 and 184, and may also mix local side-tone obtained from path 198. Mixer 192 may be a simple adder. It may perform more complicated functions such as selective attenuation (e.g., third and fourth speakers added at half-volume, or side-tone volume reduction).

Figure 10:
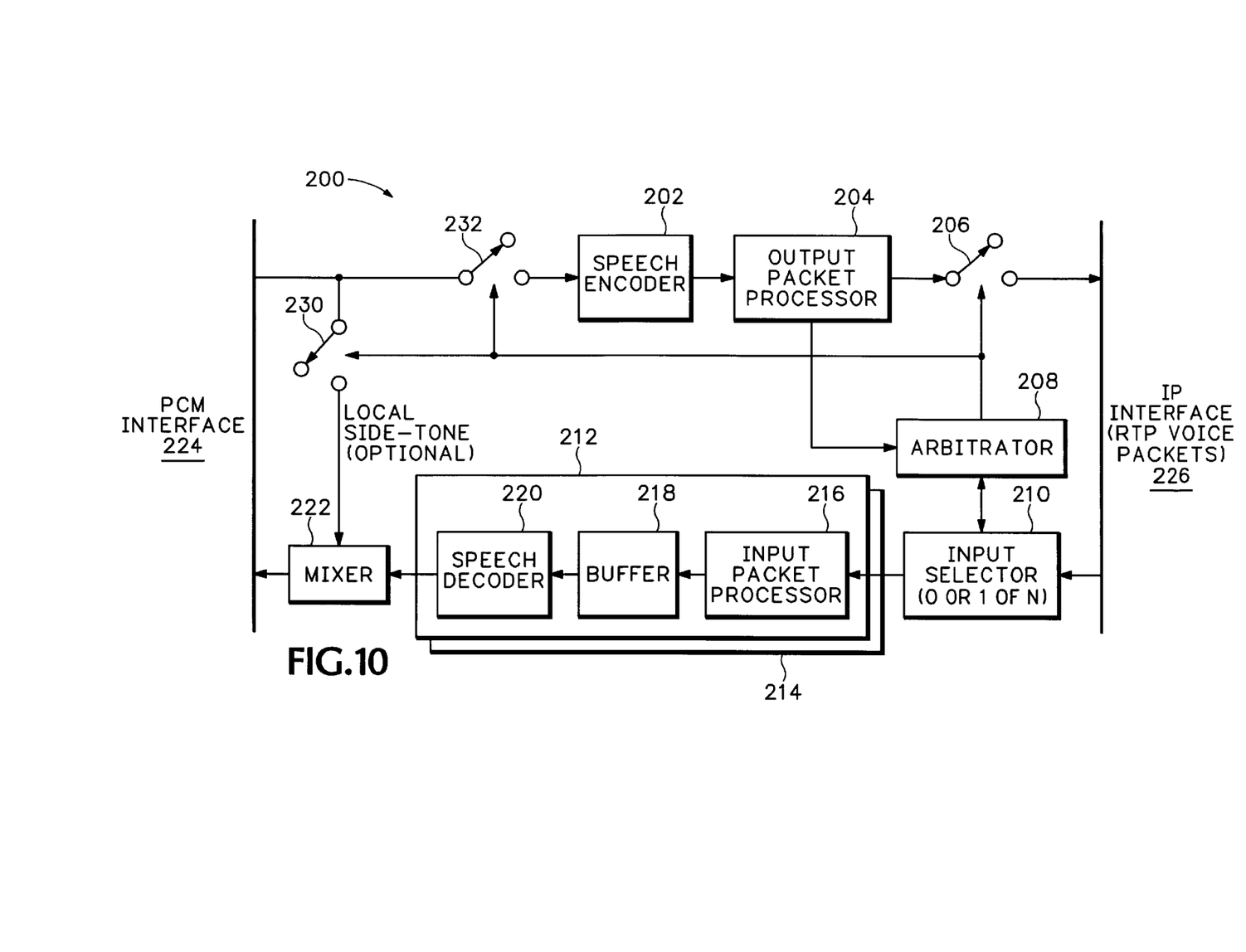

FIG. 10 shows a multi-speaker transceiver 200 with a side-tone cutout switch 230. If the local speaker loses arbitration, arbitrator 208 may activate cutout switch 230 to prevent side-tone 228 from contributing to mixer 222's output. This advantageously provides a cue to a speaker that his voice is not being transmitted to the conference. An optional switch 232 may also operate to signal speech encoder 202 when no encoding is necessary due to a lost arbitration.

Figure 11:
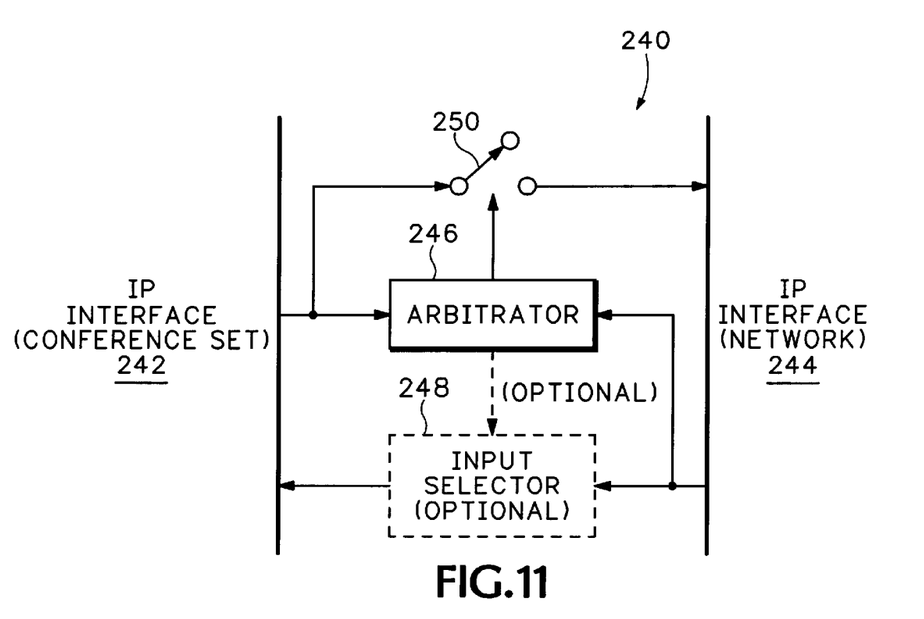

Although transceivers described above are shown as existing between a two-way IP interface and a two-way analog or digital pulse-code-modulation (PCM) interface, embodiments of the invention may include somewhat more or somewhat less. FIG. 11 shows one minimal implementation of a transceiver 240, which provides little more than an arbitrator 246 and an input selector 248. Arbitrator 246 reviews RTP headers from packets originating from both the conference set interface 242 and the network interface 244. Transceiver 240 implements an outbound switch 250 to reduce network bandwidth when the outbound signal loses arbitration. The optional input selector 248 may also use arbitration results to select appropriate inputs for pass-through to the conference set. It is not necessary that both outbound and inbound arbitration functions be implemented, although outbound arbitration functions are preferable because they reduce network bandwidth requirements.

Transceiver 240 does not modify RTP packets passing in either direction—it merely decides whether or not to pass on the packets at all. Downstream hardware would be responsible for packetization, encode/decode, and mixing.

Figure 12:
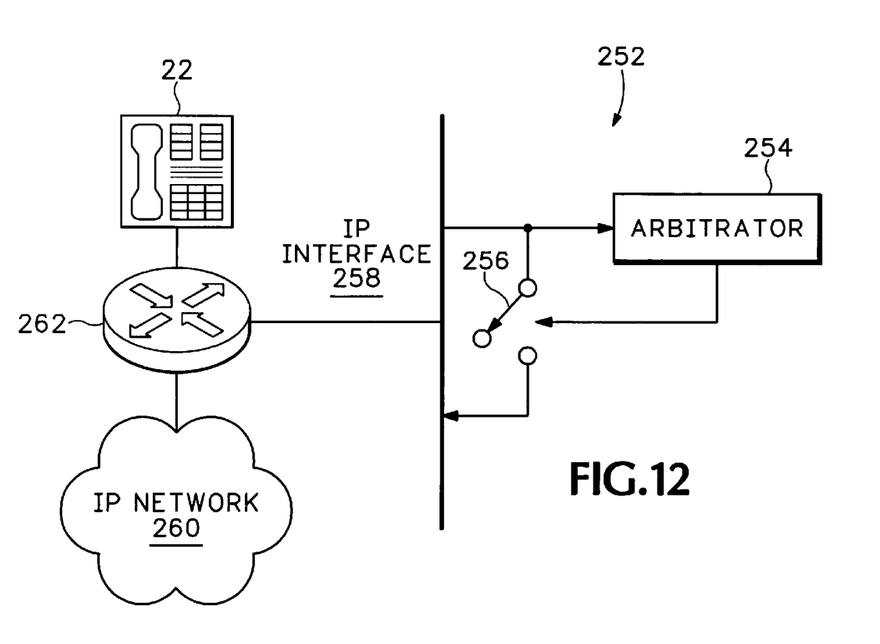

In a further minimal embodiment, a transceiver 252 maintains a single physical interface 258 connected to IP network 260, e.g., by router 262. Transceiver 252 subscribes to a multicast group address for a conference through router 262. Transceiver 252 also communicates with conference set 22 through router 262 (this data path may optionally include a voice gateway between 262 and 22, not shown). Within transceiver 252, arbitrator 254 examines both incoming multicast remote conference packets and outgoing local conference packets, using source identifiers to monitor the origination point of each. By operating packet switch 256, transceiver 252 can effectively remove both inbound and outbound packets that lose arbitration.

After reading this disclosure, one of ordinary skill in the art will recognize that many advantageous modifications to the disclosed embodiments are enabled by the concepts taught herein. For example, more complex transceivers according to the invention may encompass the entire conference set, including a microphone, a speaker, and an analog/digital interface. And although the described embodiments focus on audio conferencing, the present invention is also applicable to voice-controlled video conferencing. Arbitration may be performed on the talk streams of a packet video conference, with the results affecting both voice and video packets from the same source.

Even though the context of the disclosure is an always-up conferencing network, a large (but temporary or intermittent) packet network conference may also utilize the present invention. The packet network itself need not use either IP or RTP—such usage in this disclosure merely reflects the predominance of these protocols in data networking today. Other modifications to the disclosed embodiments will be obvious to those of ordinary skill in the art upon reading this disclosure, and are intended to fall within the scope of the invention as claimed.

What is claimed is:

1. A distributed conferencing system comprising:
   multiple conferencing transceivers that communicate audio conference data to each other over a packet data network using a shared multicast group address, each transceiver comprising:
   a bi-directional conference local data interface connected to at least one local conferencing point;
   a bidirectional conference remote packet data interface connected to said packet data network;
   a first data flow path from said local data interface to said remote packet data interface and a second data flow path from said remote packet data interface to said local data interface;
   a switch inserted in said first data flow path; and
   an arbitrator that monitors source attributes of conference data appearing at each of said interfaces and opens said switch when the number of contemporaneously received sources of conference data exceeds a preset maximum and the source attributes of conference data appearing at said remote packet data interface take precedence over the source attributes of conference data appearing at said local data interface.

2. The distributed conferencing system of claim 1, wherein the conferencing data originating at each of the multiple conferencing transceivers are assigned unique source values and the arbitrator determines which conferencing data takes precedence according to the assigned source values.

3. The distributed conferencing system of claim 2 wherein the source values are randomly generated numbers.

4. The distributed conferencing system of claim 1, wherein each of transceivers periodically transmits control packets containing a canonical name associated with their local conferencing point to the others of said transceivers, and wherein said arbitrator bases its source precedence decision on a stored precedence of canonical names.

5. The distributed conferencing system of claim 1, further comprising a bridge circuit connecting at least two local conferencing points to the bi-directional conference local data interface of one of said conferencing transceivers.

6. The distributed conferencing system of claim 1, further comprising at least one conferencing receiver that receives audio conference data from said conferencing transceivers over said packet data network using said shared multicast group address, said receiver connected to a receive-only conference point.

7. The distributed conferencing system of claim 1, wherein said transceivers also communicate video conference data packets, associated with said audio conference data packets, to each other over said packet data network using said shared multicast group address.

8. A distributed conferencing system comprising:
   multiple conferencing transceivers that each communicate their local audio conference data stream to each of the other transceivers over a packet data network using a shared multicast group address, each transceiver having an arbitrator that monitors source values uniquely associated with each local and remote audio conference data stream received by the transceiver and independently limits active data streams based on those source values.

9. An audio conferencing transceiver comprising:
   a bi-directional conference local data interface;
   a bi-directional conference remote packet data interface;
   a first data flow path from said local data interface to said remote packet data interface and a second data flow path from said remote packet data interface to said local data interface;
   a switch inserted in said first data flow path; and
   an arbitrator that monitors source attributes of conference data appearing at each of said interfaces and opens said switch when the number of sources of conference data exceeds a preset maximum and the source attributes of conference data appearing at said remote packet data interface take precedence over the source attributes of conference data appearing at said local data interface.

10. The audio conferencing transceiver of claim 9, wherein said local data interface is a packet data interface.

11. The audio conferencing transceiver of claim 10, wherein said local data interface and said packet data interface share a common physical network connection.

12. The audio conferencing transceiver of claim 9, wherein said first data flow path further comprises a speech encoder and a packetizer, and wherein said second data flow path comprises a depacketizer, a data buffer, and a speech decoder.

13. The audio conferencing transceiver of claim 12, wherein said local data interface is a pulse-code-modulated digital data interface.

14. The audio conferencing transceiver of claim 12, wherein said local data interface is an analog audio interface.

15. The audio conferencing transceiver of claim 14, further comprising a microphone and a speaker connected to said analog audio interface.

16. The audio conferencing transceiver of claim 9, wherein said second data flow path comprises an input selector in communication with said arbitrator, said input selector removing from said second data flow path packets corresponding to one or more sources of conference data when so instructed by said arbitrator.

17. The audio conferencing transceiver of claim 9, wherein said first data flow path further comprises a serial speech encoder and packetizer, and wherein said second data flow path further comprises a first serial depacketizer, data buffer, and speech decoder.

18. The audio conferencing transceiver of claim 17, wherein said second data flow path further comprises
   a second serial depacketizer, data buffer, and speech decoder in parallel with said first serial depacketizer, data buffer, and speech decoder, and
   a mixer connected to said first and second speech decoders.

19. The audio conferencing transceiver of claim 18, further comprising a local side-tone path from said first data flow path to said mixer.

20. The audio conferencing transceiver of claim 19, wherein said local side-tone path is switched by said arbitrator.

21. The audio conferencing transceiver of claim 18, further comprising a signal path from said input selector to said data buffer allowing said input selector to flush data from said data buffer corresponding to an identified data source.

22. The audio conferencing transceiver of claim 9, further comprising a local side-tone path from said first data flow path to said second data flow path.

23. The audio conferencing transceiver of claim 22, wherein said local side-tone path is switched by said arbitrator.

24. The audio conferencing transceiver of claim 9, wherein said transceiver resides within a packet data voice gateway.

25. A method for packet data conferencing between multiple remote conference participants comprising the steps of:
   transmitting each remote conference participant's voice to other remote conference participants by transmitting a transmit packet data talk stream from a transceiver local to that conference participant to a multicast group address;
   receiving, at each said transceiver local to a remote conference participant, receive packet data talk streams from other remote conference participants sent to said multicast group address;
   ranking, at each said transceiver, that transceiver's transmit packet data talk stream source against each receive packet data talk stream source; and
   inhibiting said transmitting step at one of said transceivers when the total number of packet data talk streams sensed by that transceiver exceeds a preset maximum and the transmit packet data talk stream source ranks lowest in said ranking step.

26. The method of claim 25, further comprising assigning each transceiver a unique identifier and attaching this identifier to each packet in that transceiver's transmit packet data talk stream.

27. The method of claim 26, wherein said ranking step comprises numerically ranking said identifiers in a preset order.

28. The method of claim 27, wherein said unique identifiers are assigned randomly.

29. The method of claim 28, wherein said packet data talk streams utilize the Real-time Transport Protocol, and wherein said identifier comprises the synchronization source identifier of the Real-time Transport Protocol packet header.

30. The method of claim 25, further comprising attaching a timestamp to each packet in each packet data talk stream.

31. The method of claim 30, wherein said ranking step comprises ranking talk streams according to the first-received timestamp for each packet data talk stream.

32. The method of claim 25, further comprising identifying a packet data talk stream with a super-priority allowing it to win all said ranking.

33. The method of claim 25, further comprising discarding, at each said transceiver, a receive packet data talk stream when the total number of packet data talk streams sensed by that transceiver exceeds a preset maximum and that receive packet data talk stream source ranks lowest in said ranking step.

34. The method of claim 33, wherein said ranking step compares each receive packet data talk stream source against each other receive packet data talk stream source.

35. The method of claim 25, wherein said inhibiting step always inhibits the transmit packet data talk stream regardless of ranking when, at the inception of voice activity by the transmitter's local conference participant, the total number of received packet data talk streams sensed by that transceiver equals or exceeds said preset maximum.

36. The method of claim 25, wherein said inhibiting step is disabled for an active transmit packet data talk stream a preset time after the inception of voice activity by the transmitter's local conference participant.

37. The method of claim 36, wherein said preset time is an estimated worse-case round trip delay for a conference.

38. A method for operating an audio conferencing transceiver comprising the steps of:
   receiving multicast audio conferencing packets at a remote packet data interface;
   receiving unicast audio conferencing packets at a local packet data interface;
   monitoring both the source attributes of conferencing packets appearing at each of said interfaces and the number of concurrent sources of conference packets; and
   multicast transmitting said unicast audio conferencing packets through said remote packet data interface unless the number of concurrent sources of conference data exceeds a preset maximum and the source attributes of said multicast audio conferencing packets take precedence over the source attributes of said unicast data packets.

39. The method of claim 38, further comprising the step of unicast transmitting said multicast audio conferencing packets through said local packet data interface.

40. The method of claim 39, wherein said unicast transmitting step occurs for each source of said multicast audio conferencing packets, unless the number of concurrent sources of conference data exceeds a preset maximum and the source attributes for that particular source of said multicast audio conferencing packets rank lower than the source attributes of other concurrent sources of audio conferencing packets.

41. A computer readable medium containing software for operating an audio conferencing transceiver, the software comprising:
   code for receiving multicast audio conferencing packets at a remote packet data interface;

code for receiving unicast audio conferencing packets at a local packet data interface;

code for monitoring both the source attributes of conferencing packets appearing at each of said interfaces and the number of concurrent sources of conference packets; and code for multicast transmitting said unicast audio conferencing packets through said remote packet data interface unless the number of concurrent sources of conference data exceeds a preset maximum and the source attributes of said multicast audio conferencing packets take precedence over the source attributes of said unicast data packets.

42. A computer readable medium according to claim 41, further including code for unicast transmitting said multicast audio conferencing packets through said local packet data interface.

43. A computer readable medium according to claim 42, wherein said code for unicast transmitting is performed for each source of said multicast audio conferencing packets, unless the number of concurrent sources of conference data exceeds a preset maximum and the source attributes for that particular source of said multicast audio conferencing packets rank lower than the source attributes of other concurrent sources of audio conferencing packets.

44. A system for operating an audio conferencing transceiver comprising:

means for receiving multicast audio conferencing packets at a remote packet data interface;

means for receiving unicast audio conferencing packets at a local packet data interface;

means for monitoring both the source attributes of conferencing packets appearing at each of said interfaces and the number of concurrent sources of conference packets; and means for multicast transmitting said unicast audio conferencing packets through said remote packet data interface unless the number of concurrent sources of conference data exceeds a preset maximum and the source attributes of said multicast audio conferencing packets take precedence over the source attributes of said unicast data packets.

45. The system of claim 44 including means for unicast transmitting said multicast audio conferencing packets through said local packet data interface.

46. The system of claim 45, wherein said means for unicast transmitting occurs for each source of said multicast audio conferencing packets, unless the number of concurrent sources of conference data exceeds a preset maximum and the source attributes for that particular source of said multicast audio conferencing packets rank lower than the source attributes of other concurrent sources of audio conferencing packets.

47. A distributed conferencing system according to claim 8 wherein each source value is a randomly generated number that uniquely identifies the associated data stream.

* * * * *